US009412019B2

(12) United States Patent
Chen et al.

(10) Patent No.: US 9,412,019 B2
(45) Date of Patent: Aug. 9, 2016

(54) METHODS FOR EXTRACTING SHAPE FEATURE, INSPECTION METHODS AND APPARATUSES

(71) Applicants: TSINGHUA UNIVERSITY, Beijing (CN); NUCTECH COMPANY LIMITED, Beijing (CN)

(72) Inventors: Zhiqiang Chen, Beijing (CN); Li Zhang, Beijing (CN); Ziran Zhao, Beijing (CN); Qingping Huang, Beijing (CN); Qiang Li, Beijing (CN); Jianping Gu, Beijing (CN); Yunda Sun, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 150 days.

(21) Appl. No.: 14/136,462

(22) Filed: Dec. 20, 2013

(65) Prior Publication Data

US 2014/0185923 A1 Jul. 3, 2014

(30) Foreign Application Priority Data

Dec. 27, 2012 (CN) .......................... 2012 1 0581466

(51) Int. Cl.
*G06K 9/00* (2006.01)
*G06T 7/00* (2006.01)
*G06T 7/60* (2006.01)

(52) U.S. Cl.
CPC ........ *G06K 9/00523* (2013.01); *G06K 9/00201* (2013.01); *G06K 9/00536* (2013.01); *G06T 7/0004* (2013.01); *G06T 7/608* (2013.01); *G06K 2209/09* (2013.01); *G06T 2207/10081* (2013.01); *G06T 2207/30112* (2013.01)

(58) Field of Classification Search
None
See application file for complete search history.

(56) References Cited

U.S. PATENT DOCUMENTS

| | | | | |
|---|---|---|---|---|
| 4,687,933 | A | | 8/1987 | Loy |
| 5,006,299 | A | | 4/1991 | Gozani et al. |
| 5,114,662 | A | | 5/1992 | Gozani et al. |
| 5,598,453 | A | | 1/1997 | Baba et al. |
| 6,026,171 | A | * | 2/2000 | Hiraoglu et al. ...... G01T 1/2985 250/363.04 |
| 6,148,095 | A | | 11/2000 | Prause et al. |
| 6,539,330 | B2 | | 3/2003 | Wakashiro |
| 7,347,622 | B2 | | 3/2008 | Sadakane et al. |
| 7,362,847 | B2 | | 4/2008 | Bijjani |
| 8,791,957 | B2 | | 7/2014 | Kadomura et al. |
| 2002/0029127 | A1 | | 3/2002 | Wakashiro |
| 2006/0002585 | A1 | | 1/2006 | Larson et al. |
| 2006/0290695 | A1 | | 12/2006 | Salomie |

(Continued)

OTHER PUBLICATIONS

Megherbi, Najla, Gregory T. Flitton, and Toby P. Breckon. "A classifier based approach for the detection of potential threats in CT based Baggage Screening." ICIP. 2010. 6 pages.*

(Continued)

*Primary Examiner* — Sumati Lefkowitz
*Assistant Examiner* — Ryan P Potts
(74) *Attorney, Agent, or Firm* — Pillsbury Winthrop Shaw Pittman LLP

(57) ABSTRACT

Methods for extracting a shape feature of an object and security inspection methods and apparatuses. Use is made of CT's capability of obtaining a 3D structure. The shape of an object in an inspected luggage is used as a feature of a suspicious object in combination with a material property of the object. For example, a false alarm rate in detection of suspicious explosives may be reduced.

36 Claims, 6 Drawing Sheets

(56) References Cited

U.S. PATENT DOCUMENTS

| | | | | |
|---|---|---|---|---|
| 2007/0041491 | A1 | 2/2007 | Sadakane et al. | |
| 2007/0133744 | A1 | 6/2007 | Bijjani | |
| 2007/0200566 | A1 | 8/2007 | Clark et al. | |
| 2008/0049973 | A1 | 2/2008 | Valadez et al. | |
| 2008/0181357 | A1 | 7/2008 | Bendahan | |
| 2009/0092220 | A1 * | 4/2009 | Chen | G01N 23/046 378/5 |
| 2010/0046704 | A1 | 2/2010 | Song et al. | |
| 2010/0208972 | A1 * | 8/2010 | Bouchard | G01F 23/288 382/132 |
| 2011/0081071 | A1 | 4/2011 | Benson et al. | |
| 2011/0085695 | A1 | 4/2011 | Yilkiz et al. | |
| 2011/0172972 | A1 * | 7/2011 | Gudmundson | G01N 23/10 703/1 |
| 2011/0228896 | A1 | 9/2011 | Peschmann | |
| 2011/0304619 | A1 | 12/2011 | Fu et al. | |
| 2014/0185873 | A1 | 7/2014 | Li | |
| 2014/0185874 | A1 | 7/2014 | Li | |

OTHER PUBLICATIONS

U.S. Notice of Allowance mailed May 11, 2015 in corresponding U.S. Appl. No. 14/136,426.

U.S. Office Action dated Feb. 22, 2016 in corresponding U.S. Appl. No. 14/136,402.

* cited by examiner

METHODS FOR EXTRACTING SHAPE FEATURE, INSPECTION METHODS AND APPARATUSES

This application claims priority to Chinese Patent Application No. 201210581466.6 filed on Dec. 27, 2012, the disclosure of which is incorporated herein in its entirety by reference.

FIELD

The present disclosure relates to automatic detection of suspicious objects by radiography, and in particular to methods of extracting a shape feature of an object in a computed tomography (CT) system, security inspection methods and apparatuses.

BACKGROUND

Radiography is an essential tool in security inspection. Dual Energy Computed Tomography (DECT) technology based on DR (Digital Radiography) and CT can obtain effective atomic number and equivalent electron density of the inside of a scanned object while obtaining three-dimensional structure information of the object. This is an advantageous technology in addressing the concern of detecting explosives.

SUMMARY

Automatic detection of explosives or suspicious objects is not satisfactory. Typical algorithms are mostly applied to DEDR (Dual Energy DR), and can hardly break through the technical limit of the overlapping of perspective structures in DR. DECT can use a similar method after obtaining a scan image. Particularly, DECT determines whether properties of atomic number and density on pixel-level or segmented two dimensional region-level in the image are similar to those of some explosives. This method is based on only material properties. However, it might incur frequent false alarms in the presence of influences from artifacts, metal interference, and non-suspicious objects.

The present disclosure provide a method for extracting a shape feature of an object and security inspection methods and apparatuses, in order to improve the accuracy of security inspection.

In an aspect of the present disclosure, a method to extract a shape feature of an object in a CT system is provided comprising: acquiring slice data of luggage under inspection with the CT system; generating, from the slice data, 3-dimensional (3D) volume data of at least one object in the luggage; calculating, based on the 3D volume data, a first depth projection image of the object in a direction perpendicular to a horizontal plane, and second, third and fourth depth projection images in the other three directions, wherein a projection direction of the fourth depth projection image is orthogonal to projection directions of the second and third depth projection images; calculating a metric of probability that the first depth projection image might contain the horizontal plane; calculating a metric of symmetry for each of the first, second, third, and fourth depth projection images; and generating a shape feature parameter for the object at least based on the metric of probability and the respective metrics of symmetry of the first to fourth depth projection images.

In another aspect of the present disclosure, an apparatus to extract a shape feature of an object in a CT system is provided comprising: means for acquiring slice data of luggage under inspection with the CT system; means for generating, from the slice data, 3-dimensional (3D) volume data of at least one object in the luggage; calculating, based on the 3D volume data, a first depth projection image of the object in a direction perpendicular to a horizontal plane, and second, third and fourth depth projection images in the other three directions, wherein a projection direction of the fourth depth projection image is orthogonal to projection directions of the second and third depth projection images; means for calculating a metric of probability that the first depth projection image might contain the horizontal plane; means for calculating a metric of symmetry for each of the first, second, third, and fourth depth projection images; and means for generating a shape feature parameter for the object at least based on the metric of probability and the respective metrics of symmetry of the first to fourth depth projection images.

In a further aspect of the present disclosure, a method to extract a shape feature of an object in a CT system is provided comprising: acquiring slice data of luggage under inspection with the CT system; generating, from the slice data, 3-dimensional (3D) volume data of at least one object in the luggage; calculating, based on the 3D volume data, first, second and third depth projection images of the object in three directions, wherein a projection direction of the third depth projection image is orthogonal to projection directions of the first and second depth projection images; calculating a metric of symmetry for each of the first, second and third depth projection images; and generating a shape feature parameter for the object at least based on the respective metrics of symmetry of the first to third depth projection images.

In a still further aspect of the present disclosure, an apparatus to extract a shape feature of an object in a CT system is provided comprising: means for acquiring slice data of luggage under inspection with the CT system; means for generating, from the slice data, 3-dimensional (3D) volume data of at least one object in the luggage; means for calculating, based on the 3D volume data, first, second and third depth projection images of the object in three directions, wherein a projection direction of the third depth projection image is orthogonal to projection directions of the first and second depth projection images; means for calculating a metric of symmetry for each of the first, second and third depth projection images; and means for generating a shape feature parameter for the object at least based on the respective metrics of symmetry of the first to third depth projection images.

In another aspect of the present disclosure, a method of security inspection of luggage in a CT system is provided comprising: acquiring slice data of luggage under inspection with the CT system; generating, from the slice data, 3-dimensional (3D) volume data of at least one object in the luggage; calculating, based on the 3D volume data, a first depth projection image of the object in a direction perpendicular to a horizontal plane, and second, third and fourth depth projection images in the other three directions, wherein a projection direction of the fourth depth projection image is orthogonal to projection directions of the second and third depth projection images; calculating a metric of probability that the first depth projection image might contain the horizontal plane; calculating a metric of symmetry for each of the first, second, third, and fourth depth projection images; generating a shape feature parameter for the object at least based on the metric of probability and the respective metrics of symmetry of the first to fourth depth projection images; and determining whether the object is suspicious based on the shape feature parameter and a physical property of material contained in the object.

In a further aspect of the present disclosure, an apparatus for security inspection of luggage in a CT system is provided comprising: means for acquiring slice data of luggage under inspection with the CT system; means for generating, from the slice data, 3-dimensional (3D) volume data of at least one object in the luggage; means for calculating, based on the 3D volume data, a first depth projection image of the object in a direction perpendicular to a horizontal plane, and second, third and fourth depth projection images in the other three directions, wherein a projection direction of the fourth depth projection image is orthogonal to projection directions of the second and third depth projection images; means for calculating a metric of probability that the first depth projection image may contain the horizontal plane; calculating a metric of symmetry for each of the first, second, third, and fourth depth projection images; means for generating a shape feature parameter for the object at least based on the metric of probability and the respective metrics of symmetry of the first to fourth depth projection images; and means for determining whether the object is suspicious based on the shape feature parameter and a physical property of material contained in the object.

In a further aspect of the present disclosure, a method of security inspection of luggage in a CT system is provided comprising: acquiring slice data of luggage under inspection with the CT system; generating, from the slice data, 3-dimensional (3D) volume data of at least one object in the luggage; calculating, based on the 3D volume data, first, second and third depth projection images of the object in three directions, wherein a projection direction of the third depth projection image is orthogonal to projection directions of the first and second depth projection images; calculating a metric of symmetry for each of the first, second and third depth projection images; generating a shape feature parameter for the object at least based on the respective metrics of symmetry of the first to third depth projection images; and determining whether the object is suspicious based on the shape feature parameter and a physical property of material contained in the object.

In a still further aspect of the present disclosure, an apparatus for security inspection of luggage in a CT system is provided comprising: means for acquiring slice data of luggage under inspection with the CT system; means for generating, from the slice data, 3-dimensional (3D) volume data of at least one object in the luggage; means for calculating, based on the 3D volume data, first, second and third depth projection images of the object in three directions, wherein a projection direction of the third depth projection image is orthogonal to projection directions of the first and second depth projection images; means for calculating a metric of symmetry for each of the first, second and third depth projection images; means for generating a shape feature parameter for the object at least based on the respective metrics of symmetry of the first to third depth projection images; and means for determining whether the object is suspicious based on the shape feature parameter and a physical property of material contained in the object.

The above solutions utilize shape feature of an object, and thus reduce false alarm rate in detecting explosives or suspicious objects and be very useful.

BRIEF DESCRIPTION OF THE DRAWINGS

The following figures illustrate implementations of the present disclosure. The figures and implementations provide some embodiments of the present disclosure in a non-limiting and non-exclusive manner, in which.

DETAILED DESCRIPTION OF THE EMBODIMENTS

Figure 1:
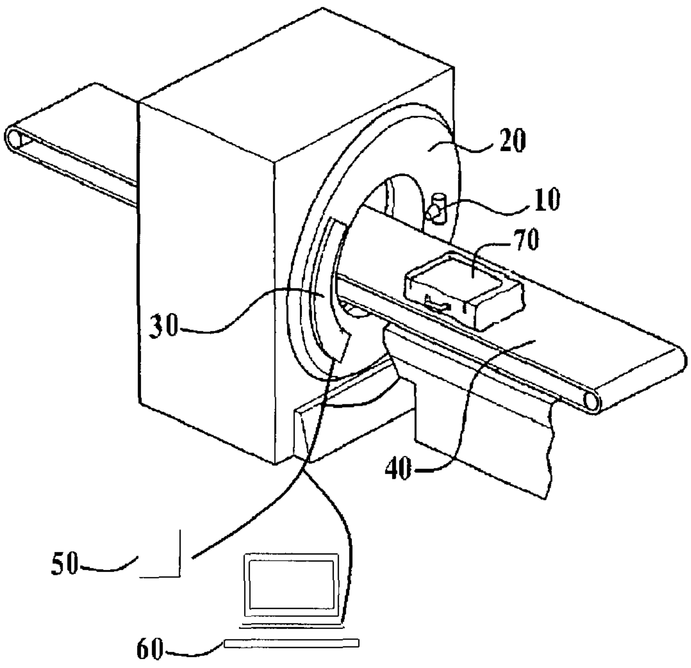
FIG. 1 is a schematic diagram showing the structure of a CT system according to an embodiment of the present disclosure.

In the following, particular embodiments of the present disclosure will be detailed. The described embodiments are illustrative and do not limit the scope of the present disclosure. Numerous specific details are illustrated for a clear and thorough understanding of the present disclosure. It should be apparent to those skilled in the art that these specific details are not necessary for implementation of the present disclosure. Detailed description of known circuits, materials or methods are omitted which otherwise may obscure the present disclosure.

Throughout the specification, reference to "an embodiment," "embodiments," "an example" or "examples" means that particular features, structures or characteristics described in connection with such embodiment or example are contained in at least one embodiment of the present disclosure. The phrase "an embodiment," "embodiments," "an example" or "examples" in various places throughout the specification does not necessarily refer to the same embodiment or example. Further, the particular features, structures or characteristics may be contained in one or more embodiments or examples in any appropriate combination and/or sub-combination. Those skilled in the art will appreciate that the term "and/or" herein indicates any or all combinations of one or more of the listed items.

In view of one or more disadvantages of conventional security inspection technologies which utilize only physical property information of objects in luggage, such as effective electron density and/or equivalent atomic number, embodiments of the present disclosure provide a method of extracting a shape feature of an object from CT slice data, and thus utilize the extracted shape feature or further in combination with physical property information to recognize a suspicious object. In an embodiment of the present disclosure, the shape feature of at least one object in inspected luggage is extracted, and if the shape feature of the object corresponds to a suspicious feature, the object is subjected to suspect recognition using a material feature (i.e., physical property information).

This can reduce a false alarm rate. In some embodiments, for a liquid-state object, for example, slice data of the inspected luggage is obtained in a CT system. Then, 3D volume data of at least one object in the luggage is generated from the slice data. Calculation is performed on the 3D volume data to obtain a first depth projection image in a direction perpendicular to a horizontal plane, and second, third and fourth depth projection images in three directions substantially orthogonal to each other. The projection direction of the fourth depth projection image is orthogonal to those of the second and third depth projection images. Next, a metric of probability that the first depth projection image might contain the horizontal plane is calculated, and a metric of symmetry is calculated for each of the first, second, third and fourth depth projection images. Finally, a shape feature parameter of the object is generated at least based on the metric of probability and the metrics of symmetry of the first to fourth depth projection images.

In another embodiment of the present disclosure, for an object that may not contain any liquid, calculation of the first depth projection image in the direction perpendicular to the horizontal plane can be omitted from the above method. For example, after obtaining the slice data of the inspected luggage in the CT system, the 3D volume data of at least one object in the luggage is generated from the slice data. Then, first, second and third depth projection images of the object in three directions substantially orthogonal to each other are calculated based on the 3D volume data. Next, a metric of symmetry is calculated for each of the first, second, and third depth projection images, and a shape feature parameter of the object is generated at least based on the metrics of symmetry of the first to third depth projection images.

According to a further embodiment of the present disclosure, the shape feature parameter extracted in the above method may be used to detect a suspicious object, for example, determining whether the object is suspicious based on the extracted shape feature parameter and physical property of material contained in the object. Alternatively, the shape feature parameter is first used to categorize the object. If the shape feature parameter of the object meets certain shape requirement, material recognition is performed on the object. In this way, the false alarm rate can be reduced.

Most real explosives have a symmetric shape, because the explosives are usually well packaged in many layers, and inevitably the shape of such packaged explosives becomes symmetric. In particular, liquid explosives have very good symmetry, and their horizontal liquid surface is an excellent shape feature. It is impossible to obtain such shape feature in any typical 2D image process method. In some embodiments, the shape feature of an object is first extracted, and then used in combination with characteristics involved in typical methods, such as atomic number and density, to achieve more efficient detection of suspicious explosives.

FIG. 1 is a schematic diagram showing the structure of a CT apparatus according to an embodiment of the present disclosure. As shown in FIG. 1, the CT apparatus of the embodiment includes a rack 20, a bearing mechanism 40, a controller 50, and a computer data processor 60. The rack 20 includes a ray source 10 configured to emit x rays for inspection, such as an x-ray machine, and a detection and collection device 30. The bearing mechanism 40 bears an inspected luggage 70, and moves it to pass through a scanning region between the ray source 10 and the detection and collection device 30 in the rack 20. At the same time, the rack 20 rotates about an axis along the travel direction of luggage 70, so that rays emitted from the ray source 10 can penetrate the luggage 70 to implement CT scanning on the luggage 70. The detection and collection device 30 may include a detector and a data collector formed in an integral module, such as a planar detector, and may be configured to detect rays having penetrated the inspected liquid-state article, obtain analog signals, convert the analog signals into digital signals, and output projection data of the inspected luggage 70 with respect to the x rays. The controller 50 is configured to control respective components of the entire system to operate in synchronization. The computer data processor 60 is configured to process data collected by the data collector, reconstruct the data and output results.

As shown in FIG. 1, the ray source 10 is placed on one side of the inspected luggage 70. The detection and collection device 30 placed on the other side of the luggage 70 includes a detector and a data collector configured to perspective data and/or multi-angle projection data of the luggage 70. The data collector includes a data amplifying and shaping circuit operable in a (current) integration mode or a pulse (counting) mode. The detection and collection device 30 has a data output cable coupled with the controller 50 and the computer data processor 60 and configured to store the collected data in the computer data processor 60 in accordance with a trigger command.

Figure 2:
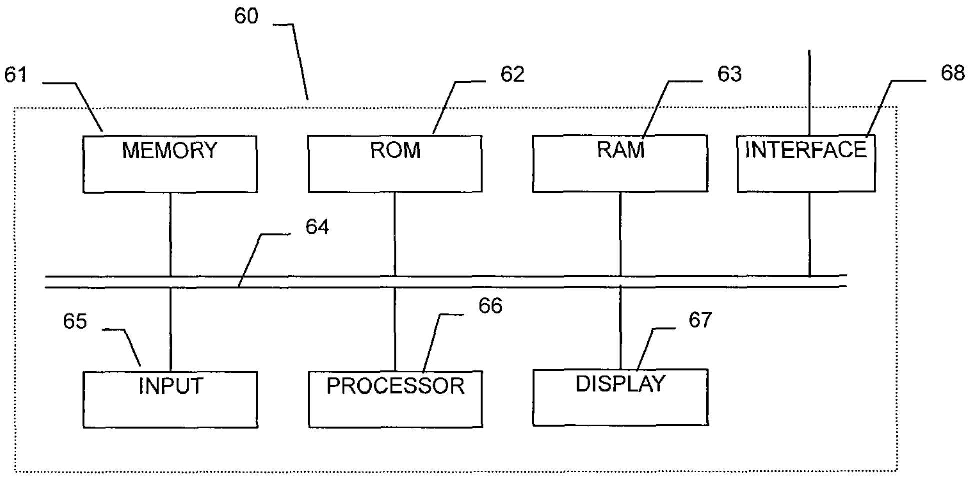
FIG. 2 shows a schematic block diagram of a computer data processor according to an embodiment of the present disclosure.

FIG. 2 shows a block diagram of the computer data processor 60 of FIG. 1. Data collected by the data collector is stored in a memory 61 through an interface unit 68 and a bus 64, as shown in FIG. 2. Read only memory (ROM) 62 stores configuration information and programs of the computer data processor. Random access memory (RAM) 63 is configured to temporarily store various data during operation of processor 66. Further, the memory 61 stores one or more computer programs for data processing. The internal bus 64 connects the memory 61, ROM 62, RAM 63, input device 65, processor 66, display device 67 and interface unit 68 with each other.

When a user inputs an operation command via the input device 65, such as a keyboard and/or mouse, instruction codes of computer programs instruct the processor 66 to execute predetermined data processing algorithms. The results of data processing are displayed on the display device 67, such as a LCD display, or directly outputted in a hardcopy form, such as being printed out.

Figure 3:
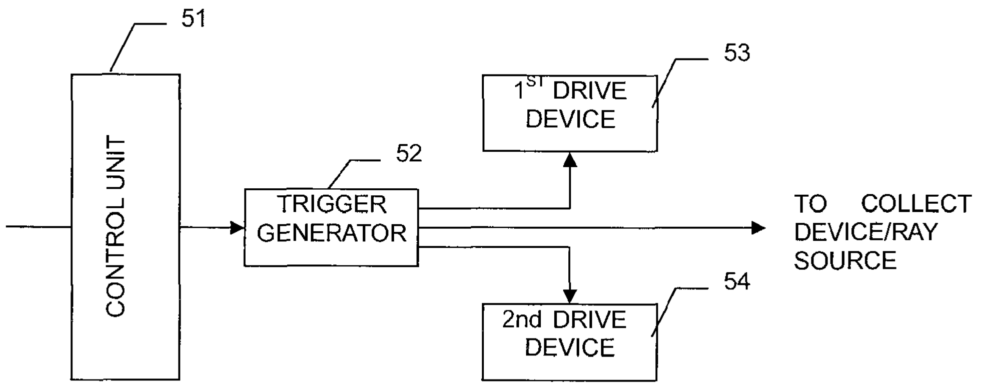
FIG. 3 shows a schematic block diagram of a controller according to an embodiment of the present disclosure.

FIG. 3 shows a block diagram of the controller according to an embodiment of the present disclosure. As shown in FIG. 3, the controller 50 includes a control unit 51 configured to control the ray source 10, the bearing mechanism 40, and the detection and collection device 30 in accordance with an instruction from the computer 60, a trigger signal generation unit 52 configured to generate, under control of the control unit, trigger commands for triggering actions of the ray source 10, the bearing mechanism 40, and the detection and collection device 30, a first driving device configured to drive the bearing mechanism 40 to convey the inspected luggage 70 in accordance with a trigger command generated by the trigger signal generation unit 52 under control of the control unit, and a second driving device 54 configured to drive the rack 20 to rotate in accordance with a trigger command generated by the trigger signal generation unit 52 under control of the control unit.

The projection data obtained by the detection and collection device 30 is stored in the computer 60 to reconstruct CT sections, and thus obtain slice data (CT slice) of the luggage 70. Then, the computer 60 executes software, for example, to extract 3D shape parameter for at least one object contained in the luggage 70 from the slice data for security inspection. According to a further embodiment, the above CT system may be a dual-energy CT system, that is, the x-ray source 10 in the rack 10 emits two kinds of rays of high and low energy levels, and the detection and collection device 30 detects projection data of the different energy levels. Then, the computer data processor 60 performs dual-energy CT reconstruction to obtain equivalent atomic number and electron density data for respective sections of the luggage 70.

Figure 4:
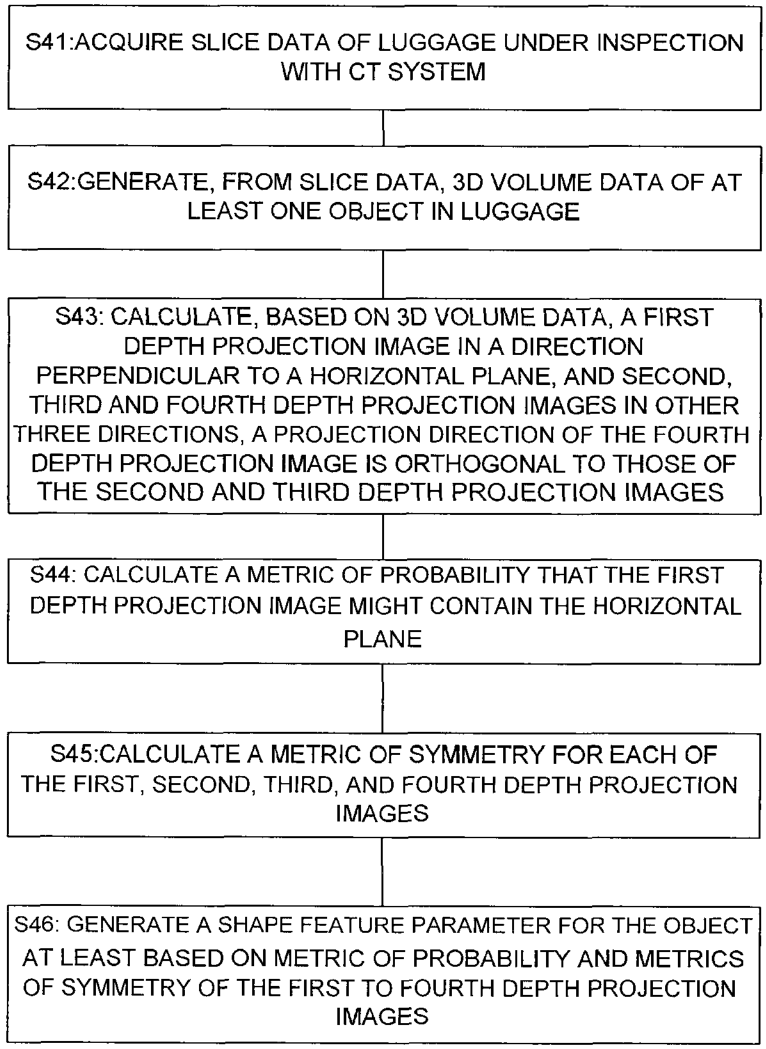
FIG. 4 is a flowchart showing a method for extracting shape feature of an object according to an embodiment of the present disclosure.

FIG. 4 is a flowchart showing a method of extracting a shape feature of an object according to an embodiment of the present disclosure. As shown in FIG. 4, slice data of inspected luggage is obtained with a CT system at step S41. For example, the slice data is obtained by dual-energy CT detection of the luggage in the above CT apparatus or some other CT apparatus. Here, the slice data commonly includes slice density image data and atomic number image data. In other embodiments, such as in a mono-energy CT system, the obtained data is linear attenuation coefficient image data of the inspected luggage.

3D volume data of at least one object in the inspected luggage is generated from the slice data at step S42. Specifically, image segmentation is performed on the slice data to segment them into multiple regions. Then, based on a relation between binary masks for the respective regions, the regions of different slice data are connected to obtain connected data for the object. Interlayer interpolation is performed on the binary masks of the connected data to obtain the 3D volume data of the object.

In an example, a 3D "object" may first be detected in the obtained slice data. Specifically, the slice data may undergo preprocessing, such as thresholding the slice data with ranges of densities and atomic numbers of suspicious objects, which is followed by unsupervised image segmentation, connection of segmented regions across sections, and resolution normalization after the connection.

In an example, the slice data may be thresholded with ranges of densities and atomic numbers of suspicious objects, to remove content of no interest. Then, the density image is subjected to unsupervised image segmentation, and segmented to multiple regions according to a positional relation between value and null fields. The segmentation here may be conducted using known algorithms, such as a one-way splitting and merging algorithm.

Next, the regions for the respective sections are connected, for example, based on confidence degree. The confidence degree is determined depending on overlapping of masks, a difference in average density, and a difference in average atomic number of two regions. The confidence degree increases with more overlapping and less difference. Assume a binary mask $o_i$, an average density $\rho_i$, and an average atomic number $\alpha_i$ for the ith region in the zth section, and a binary mask $o_j$, and average density and atomic number $\rho_j$, $\alpha_j$ for the jth region in the adjacent (z+1)th section. A confidence degree $\rho_{ij}$ that the two regions might belong to the same object may be defined as:

$$\rho_{ij}=(\Sigma(o_i \cap o_j))/\min(\Sigma o_i,\Sigma o_j)/\sqrt{(|\alpha_i-\alpha_j||\rho_i-\rho_j|)+0.1} \quad (1)$$

The two regions are matched if the confidence degree $p_{ij}$ is greater than a preset threshold $T_S$. If a single mask $o_i$ is matched with several masks $o_j$, it is determined that $o_i$ is matched with one of the masks $o_j$ having the maximal $\rho_{ij}$. After the connection of the object is completed, the average density and the average atomic number $(\bar{\rho},\bar{\alpha})$ are calculated.

Generally speaking, inter-slice resolution is far less than intra-slice resolution in DECT security inspection, and thus inter-slice interpolation on binary masks of the object is performed. The resolutions in three dimensions are consistent after the interpolation. In this way, the unobvious shape information of the object can be exhibited. An advantage of using shape information is to make the object whose shape cannot be recognized in the sections become recognizable. There are many know algorithms for 3D interpolation, such as commercially available software Intel IPP (Intel Integrated Performance Primitives) function library, or open source software Kitware VTK (Visualization Toolkit) function library.

In some embodiments, interpolation is performed with binary masks, and it is defined that for normalized volume data, the maximal side length is 50 cm. This can achieve a normalized volume of a 3D object, and remarkably reduce computation complex while guaranteeing relatively good effect. In other embodiments, interpolation may be performed in some other manners to further increase recognizability of the object's shape.

With the above step, the volume data and physical property information may be obtained for respective objects in the inspected luggage. Here, the physical property information may include, for example, average atomic number and/or average density value.

At step S43, a calculation is conducted based on the 3D volume data to obtain a first depth projection image of the object in a direction perpendicular to a horizontal plane, and second, third and fourth depth projection images in the other three directions, wherein a projection direction of the fourth depth projection image is orthogonal to projection directions of the second and third depth projection images. According to some embodiments, any two of the other three directions are substantially orthogonal to each other. In other embodiments, the three directions are defined as orthogonal as possible. In some embodiments, the angle between the projection directions of the first and second depth projection images may be used as one of the feature parameters extracted in subsequent processing.

According to some embodiment, isosurface extraction and smoothing are performed on the 3D volume data before calculation of the first to fourth depth projection images. For example, an isosurface map of the object can be obtained by performing isosurface extraction on the volume data. In embodiments, the isosurface extraction may be performed using the most common Marching Cubes algorithm. Then, the isosurface map is smoothed, in this embodiment, using an algorithm based on Laplacian filtering.

Depth Buffer is also called Z-buffering, and a basis technology for 3D surface display. This technology determines occlusion between objects, and displays non-occluded part(s) on a screen.

Figure 6:
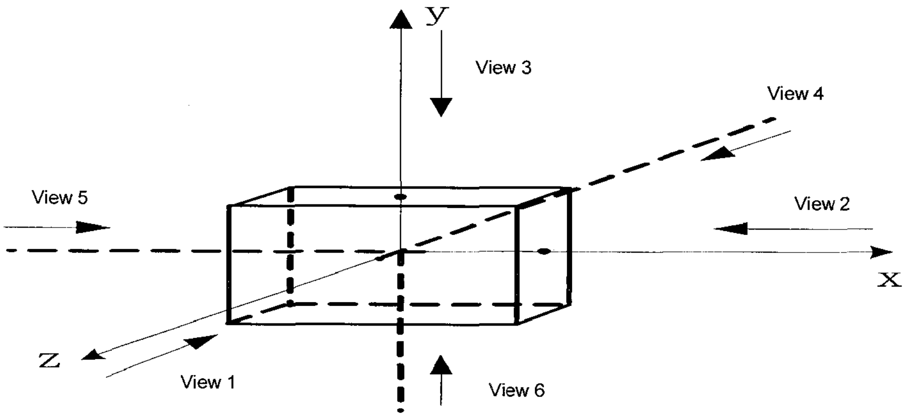
FIG. 6 is a schematic diagram showing definition of respective view angles for an object placed on a horizontal plane.
Figure 7:
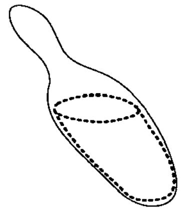
FIG. 7 is a schematic diagram showing an object containing liquid.
Figure 8:
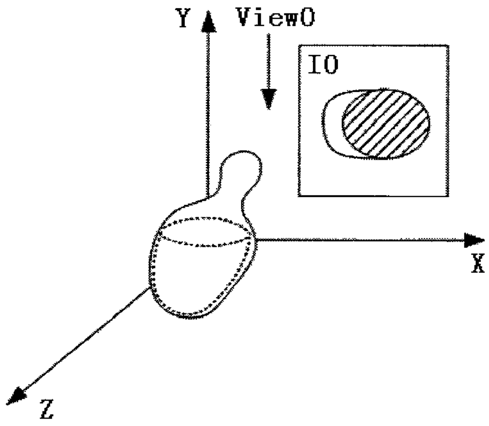
FIG. 8 is a schematic diagram showing depth projection $I_0$ obtained from a first view angle View0.
Figure 9:
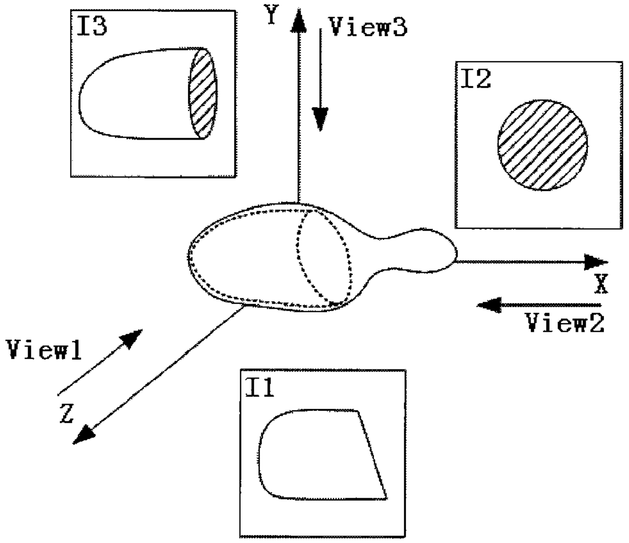
FIG. 9 is a schematic diagram depicting depth projection from three view angles View1, View2, and View3.

View angles for $I_0$~$I_3$ are defined with reference to a coordinate system shown in FIGS. 6, 8 and 9. Assume that the object is horizontally placed, and six (6) viewing directions are defined as view angles 1~6. In the case of presence of liquid shown in FIG. 7, many of the projection image values obtained from view angle ViewO shown in FIG. 8 are equal, due to the horizontal plane. Such projection has good symmetry for a non-mixture homogeneous object. Further, it is possible to obtain an "aligned" model by rotating and normalizing the model, as shown in FIG. 8. Then, by projecting at the view angles View1, View2, and View3 respectively, the symmetry of the object can be well kept in the three projections, and similarity among the three projections reflects 3D symmetry of the object.

Referring to FIG. 8, $I_0$ is a top-view projection to exhibit the horizontal plane. It requires that gray values are as identical as possible on the horizontal plane, and the upper and lower halves of an image are as symmetric as possible. The projection may be achieved by rotating the 3D model about y-axis perpendicular to the horizontal plane until the upper and lower halves of top-view projection are most symmetric. In an embodiment, the y coordinate of the model remains unchanged, while the coordinates (x,z) undergo a first alignment. At this time, the x direction preserves the maximal divergence of the model to substantially meet the implementation requirement. The alignment may use PCA (Principal Component Analysis) algorithm. After the rotation, the vertices are organized into a 3D surface for surface rendering, and the 3D model is observed vertically from top, thereby obtaining a 2D depth projection image $I_0$.

For an object with the presence of a liquid level, many values in $I_0$ are identical in magnitude, as shown in the shaded part of $I_0$. With the above alignment, the symmetry of the upper and lower halves of $I_0$ can reflect partial 3D symmetry of the object.

Referring to FIG. 9, $I_2$ has a physical meaning of the minimal area projection of the object, $I_1$ and $I_3$ are two side surfaces of the object, and $I_1$ is the maximal area projection of the object. $I_1$ resembles a primary view, $I_2$ resembles a top view, and $I_3$ resembles a side view. In this way, it is possible to preserve shape information as much as possible while meeting the requirement of real time application. Most objects in nature have good symmetry, but it is difficult to meet the projection condition in practice, and thus it is merely possible to approximate the ideal condition. In the above embodiment, the projection directions of the second and third depth projection images are made as orthogonal as possible (e.g., approximately orthogonal), and approximate the directions along which the maximal and minimal projection areas of the object in the luggage are obtained. Here, the 3D vertex coordinate matrix is aligned by the PCA algorithm, and then $I_1$~$I_3$ are obtained by projecting at the three view angles as shown in FIG. 9.

At step S44, a metric of probability that the first depth projection image might contain a horizontal plane is calculated. For example, an area ratio of the liquid surface part to the first projection image is calculated as the metric of probability. In another example, similarity between the shape of the liquid surface part and the shape of the first projection image is calculated as the metric of probability. Alternatively, an offset by which the center of gravity of the liquid surface part deviates from the center of gravity of the first projection image is calculated as the metric of probability.

At step S45, a metric of symmetry for each of the first, second, third, and fourth depth projection images is calculated.

At step S46, a shape feature parameter for the object is generated at least based on the metric of probability and the respective metrics of symmetry of the first to fourth depth projection images.

In another embodiment, the method further includes calculating a duty ratio and an aspect ratio for each of the second, third, and fourth depth projection images. In this case, the shape feature parameter further includes the calculated duty ratio and aspect ratio.

In another embodiment, the method further includes calculating the number of facets of the 3D model for the object based on the 3D volume data, and determining a complexity of the 3D model based on the number of facets and a predetermined average of the number of the facets. In this case, the shape feature parameter further includes the calculated complexity.

In an example, by obtaining the above 2D depth projection images, shape feature extraction of 3D model is transformed to image feature extraction of $I_0$~$I_3$. In the present embodiment, one or more of symmetry of upper and lower halves of the image, similarity between two images, duty ratio, aspect ratio and horizontal plane of the image may be used as feature. In the case of a liquid-state article with the presence of a horizontal plane, many pixels in $I_0$ have the same gray value, and the proportion of these pixels indicates a probability that a horizontal plane may exist. Further, the 3D model complexity is often too high or too low due to the presence of a mixed substance, and the 3D model complexity may be used as one dimension of the feature. A feature vector describing the object may be formed by quantizing the above features.

Let the depth projection image have gray values in the range [0, 1], a gray value 0 denotes an indefinite point, and a non-zero gray value denotes a distance between a facet and the observation location. The gray value increases as the distance decreases. The above features may be obtained as follows.

i) Obtain a probability $f^H$ for horizontal plane from the depth projection image $I_0$. Let $g_H$ denote a gray value corresponding to the maximum in the histogram of $I_0$, $t_H$ denotes a given threshold, and $f^H$ may be defined as:

$$f_H=\Sigma_{ij}((g_{ij}>g_H-t_H|g_{ij}<g_H+t_H))/(\Sigma_{ij}(g_{ij}>0)) \quad (2)$$

That is, an area ratio of the liquid level to the projection image is used as a probability that $I_0$ might contain a horizontal plane. Here, $g_{ij}$ denotes a pixel with subscripts i, j.

ii) Calculate symmetries $f_0^S$~$f_3^S$ of upper and lower halves for $I_0$~$I_3$. Let $I_0'$~$I_3'$ denote images obtained by turning $I_0$~$I_3$ upside down, and the symmetry $f_i^S$ may be defined as:

$$f_i^S=\Sigma|I_i-I_i'|/\Sigma(I_i>0|I_i'>0) \quad (3)$$

That is, the symmetry is calculated based on an average gray difference between the upside-down image and the original image.

iii) Calculate similarity $f_i^B$ between any two of $I_1$, $I_2$, and $I_3$. Here, $f_i^B$ may be defined as:

$$f_1^B=\max((\Sigma|I_1-I_2|/\Sigma(I_1>0|I_2>0)),(\Sigma|I_1-I_2'|/\Sigma(I_1>0|I_2'>0))) \quad (4)$$

The similarity may be calculated similarly to the symmetry of equation (3). $f_1^B$ may take a larger one from the similarities for ($I_1$, $I_2$) and ($I_1$, $I_2'$). The similarity $f_2^B$ between $I_2$, and $I_3$, and the similarity $f_3^B$ between $I_3$ and $I_1$ can be obtained in the same manner.

iv) Calculate a duty ratio $f_i^D$ and an aspect ratio $f_i^R$ for each of $I_1$, $I_2$ and $I_3$.

The size of a depth projection image is defined by the view point, and does not reflect any property of an object. A depth projection aspect ratio and duty ratio calculated after alignment can well describe microscopic characteristics of an object. The aspect ratio $f_i^R$ may be easily calculated by obtaining a rectangular box enclosing $I_i$. Then, the number of non-zero pixels in the rectangular box may be calculated, and divided by the area of the box to obtain the duty ratio $f_i^D$.

v) Calculate model complexity $f^C$. It has been found through experiments that models for many noisy objects consist of a few or a lot of facets. Accordingly, in an embodiment, the number $N^V$ of facets of a 3D model may be used to approximate the complexity $f^C$:

$$f^C=|N^V-N^C|/N^C \quad (5)$$

Equation (5) denotes a statistically calculated average number of model facets for a suspicious object. There are many known methods for calculating the complexity of a 3D curved surface. The method used in the embodiment is simple, high-speed, and effective.

In some embodiments, the shape feature parameter may be generated based on one or more of the probability of horizontal plane, symmetry, similarity, duty ratio and aspect ratio, and/or complexity calculated in the above i) to v).

In other embodiments, various algorithms including PCA, CPCA(Continuous PCA), NPCA(Normal PCA), rectilinearity, and Rosy(Reflective object symmetry) may be used in model alignment, though the present disclosure uses the PCA algorithm. Further, various 3DOR (3D Object Retrieval) algorithms may be used in feature extraction, such as in the phase of extracting depth projections. A typical algorithm generally extracts tens of projections, and the calculated features include moment invariants feature, Spherical Harmonic Transform coefficient, local descriptor, and Heat Kernel.

Figure 5:
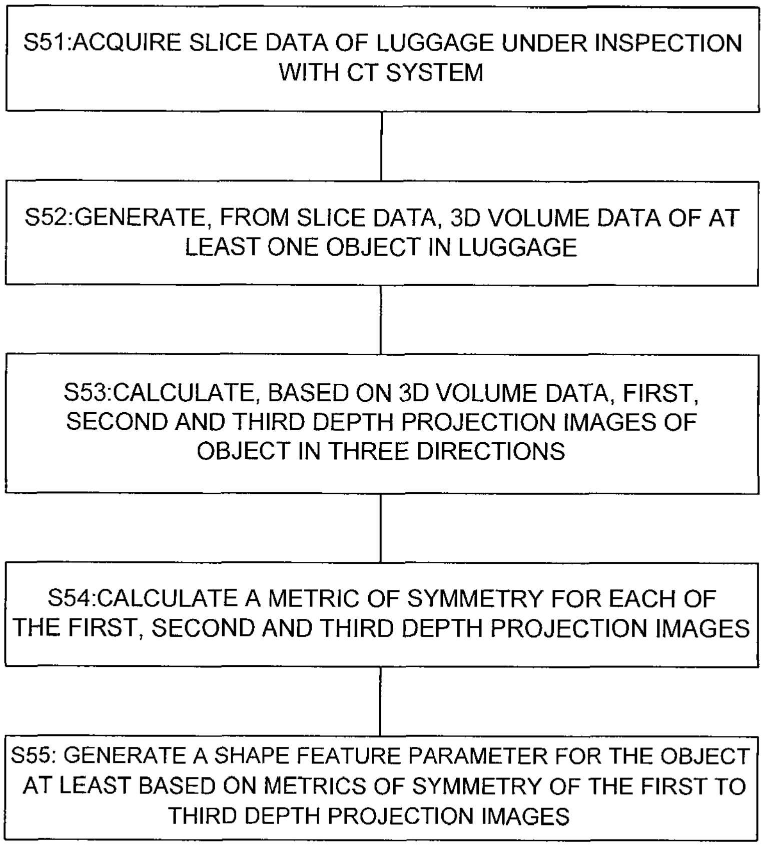
FIG. 5 is a flowchart showing a method for extracting shape feature of an object according to another embodiment of the present disclosure.

FIG. 5 is a flowchart showing a method to extract a shape feature of an object according to another embodiment of the present disclosure. The embodiment differs from that of FIG. 4 in that it is directed to a case of detecting no horizontal plane, that is, the object may not be liquid. Steps S51 and S52 correspond to the above steps S41 and S42, respectively. At step S53, calculation is performed based on the 3D volume data to obtain the first, second and third depth projection images of the object in three directions. The projection direction of the third depth projection image is orthogonal to the projection directions of the first and second depth projection images. The projection image $I_0$ in the embodiment of FIG. 4 will not be calculated. For details of the method, reference may be made to the above embodiment described in connection with FIG. 4.

At step S54, a metric of symmetry is calculated for each of the first, second, and third depth projection images. At step S55, a shape feature parameter of the object is generated at least based on the metrics of symmetry of the first to third depth projection images.

The shape feature parameter of the object calculated above may be used for recognition of an object in inspected luggage or some other purposes. In an example, a classifier may be created based on the shape feature parameter to classify the object in the luggage, and any object having a shape of interest will undergo inspection using the physical property information of the object.

In an embodiment, the respective shape feature parameters in the above steps may be combined into a 15-dimensional shape feature vector F:

$$F=\{f^H,f_0^S,f_1^S,f_2^S,f_3^S,f_1^B,f_2^B,f_3^B,f_1^D,f_2^D,f_3^D,f_1^R,f_2^R,f_3^R,f^C\} \quad (6)$$

A specific classifier is created with respect to feature vector F. The classifier, having been trained, can be used in classification and recognition of an unknown object. In an example, the created feature vector may be manually labeled on the basis of a quantity of training sample sets, and then used in creation and training of the classifier. This process corresponds to a general process in pattern recognition, and various types of classifier may be used, such as a linear classifier, a support vector machine, a decision tree, a neural network, and/or ensemble classifiers.

In an embodiment, RF (Random Forest) is used to classify the object into one of the classes: “suspicious explosive” and “non-explosive.” The principle of RF includes samples, random re-sampling of a variant dimension, and integration of multiple decision trees. The implementation includes the following steps. First, a quantity of samples is acquired. Here, 340 scanning results obtained in experiments are used for training. Next, all the scanning results are subjected to the above steps, to obtain features for 1729 objects in the sample set. These objects are manually labeled as “suspicious explosive” or “non-explosive” (in this example, there are 426 samples in the “suspicious explosive” class, and determination of whether or not suspicious is conducted with the naked eye). Then, 50 decision trees of the maximal depth of 6 are taken and subjected to RF integration training to obtain a classifier for shape determination.

The classifier may be applied to F of an unknown type to determine whether F is “suspicious explosive” or a confidence degree of being “suspicious explosive.” In this way, it is possible to realize shape-based classification and recognition. In practice, the training process may be omitted, and the respective feature parameters may be combined and determined in accordance with subjective experiences. This method utilizes a decision tree strategy, and is a simple substitute of the method described above.

A step of determination based on material feature may be further conducted for any “suspicious explosive” that is determined to be suspicious based on shape. The determination may be performed in a process of establishing a lookup table of density values and atomic numbers for explosives, taking the average density and average atomic number $(\overline{\rho},\overline{\alpha})$ obtained in the above first step, and then checking whether $(\overline{\rho},\overline{\alpha})$ indicates any explosive in the lookup table. This fulfills detection of a suspicious explosive.

Figure 10:
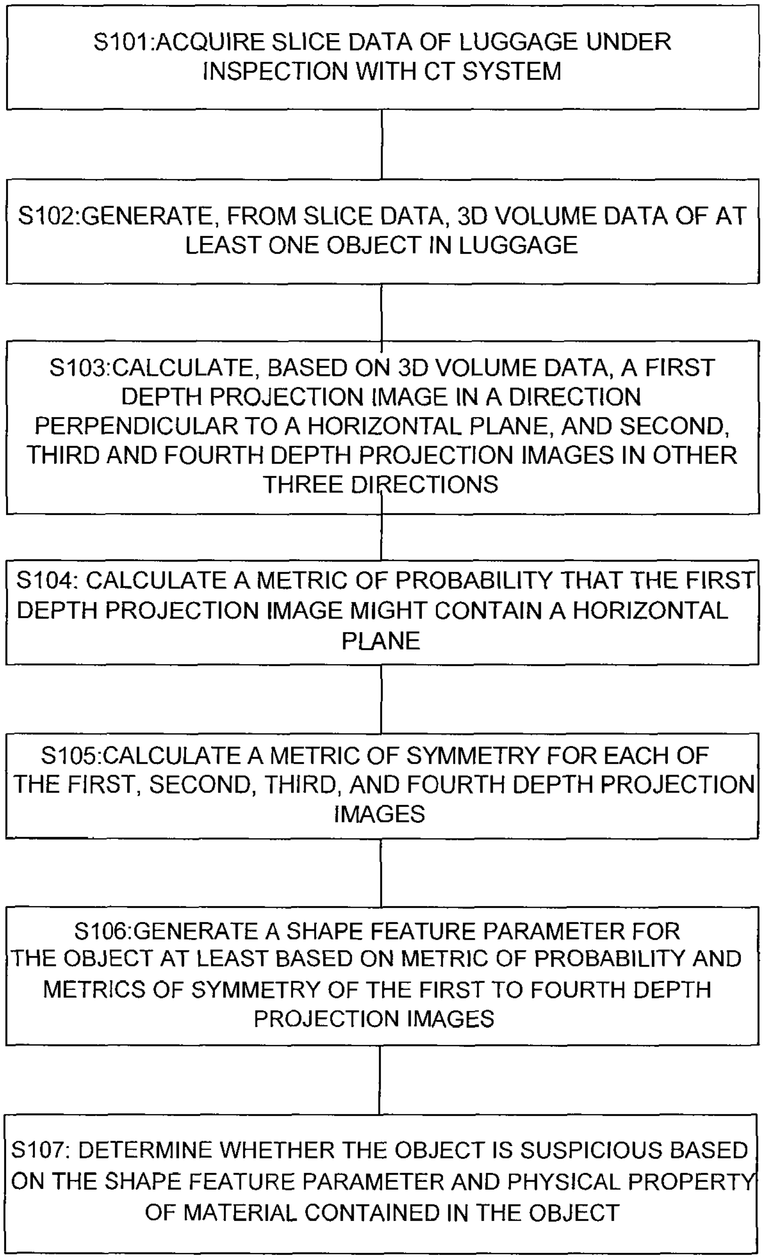
FIG. 10 is a flowchart showing a method for security inspection of luggage according to an embodiment of the present disclosure.

FIG. 10 is a flowchart showing a method for security inspection of luggage according to an embodiment of the present disclosure. Steps S101-S106 of FIG. 10 correspond to steps S41-S46 of FIG. 4, respectively, and thus detailed description thereof will be omitted. At step S107, the object in the inspected luggage is determined whether to be suspicious based on the shape feature parameter and the physical property of material contained in the object.

In an embodiment, the object in the inspected luggage is classified using a classifier based on a shape parameter. Then, if the object has a shape meeting the requirement of the shape parameter, the object is further classified using a classifier based on a physical property.

In another example, if a dual-energy CT system is used, the physical property may include equivalent atomic number and/or equivalent electron density. In this case, the object in the inspected luggage is classified using a classifier based on a shape parameter, and if the object has a shape meeting the requirement of the shape parameter, the object is further classified using a classifier based on an equivalent atomic number and/or equivalent electron density.

In a further example, if a mono-energy CT system is used, the physical property may include a linear attenuation coefficient. In this case, the object in the inspected luggage is classified using a classifier based on a shape parameter, and if the object has a shape meeting the requirement of the shape parameter, the object is further classified using a classifier based on a linear attenuation coefficient.

Figure 11:
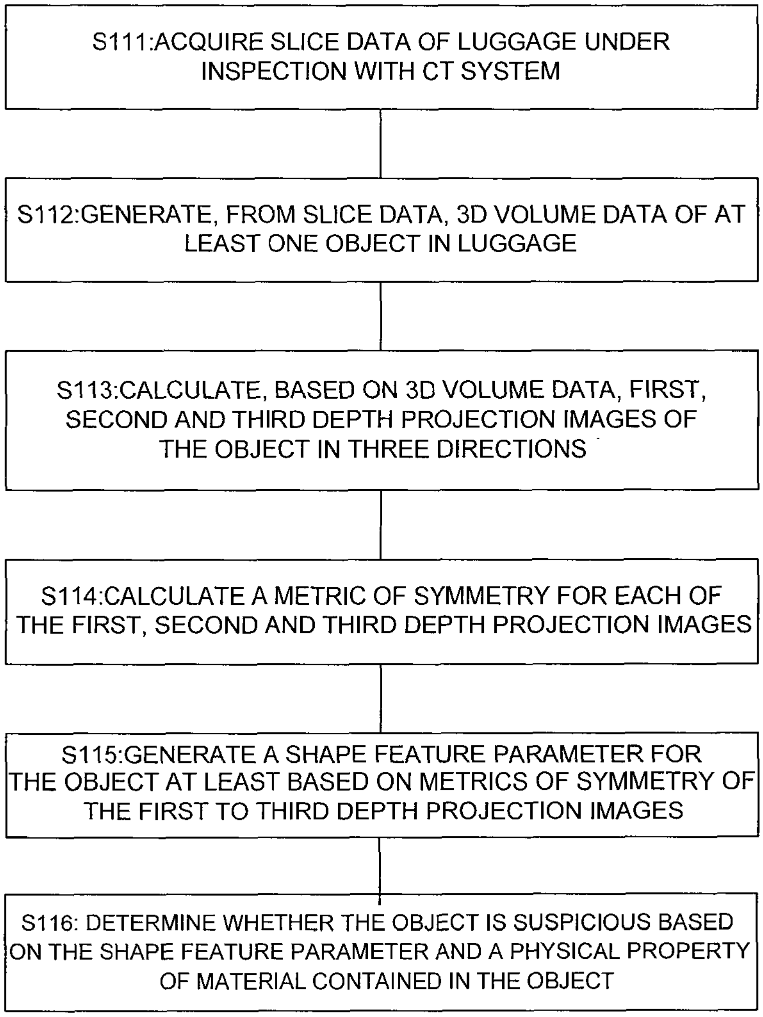
FIG. 11 is a flowchart showing a method for security inspection of luggage according to another embodiment of the present disclosure.

FIG. 11 is a flowchart showing a method for security inspection of luggage according to an embodiment of the present disclosure. Steps S111-S115 of FIG. 11 correspond to steps S51-S55 of FIG. 5, respectively, and thus detailed description thereof will be omitted. At step S116, the object in the inspected luggage is determined whether to be suspicious based on the shape feature parameter and the physical property of material contained in the object.

In an embodiment, the object in the inspected luggage is classified using a classifier based on a shape parameter. Then, if the object has a shape meeting the requirement of the shape parameter, the object is further classified using a classifier based on a physical property.

In another example, if a dual-energy CT system is used, the physical property may include equivalent atomic number and/or equivalent electron density. In this case, the object in the inspected luggage is classified using a classifier based on a shape parameter, and if the object has a shape meeting the requirement of the shape parameter, the object is further classified using a classifier based on equivalent atomic number and/or equivalent electron density.

In a further example, if a mono-energy CT system is used, the physical property may include a linear attenuation coefficient. In this case, the object in the inspected luggage is classified using a classifier based on a shape parameter, and if the object has a shape meeting the requirement of the shape parameter, the object is further classified using a classifier based on a linear attenuation coefficient.

According to some embodiments of the present disclosure, after data acquisition, 2D slice images may be first analyzed on a section basis. A series of 2D binary masks for regions of suspicious objects may be obtained through thresholding and image segmentation. Inter-slice changes in regions may be learned with a Markov process. 3D "object" data across the sections may be obtained by connecting regions that are overlapping between sections and have high similarity, performing inter-slice interpolation, and compensating for influence from low section resolution. The data amount of such a 3D object is too large and redundant to be used for recognition. The surface of the 3D object contains almost all shape information, and thus its 3D surface may be obtained by using isosurface. Then, 2D depth projections of the 3D surface may be calculated in certain condition to preserve as much shape information of the object as possible in several 2D images. The above described shape features like symmetry and horizontal plane may be obtained by analyzing these depth projections one by one or analyzing correlation between any two of the projections. As can be seen from the figures, the shape features are 1D shape features obtained through 2D sections processing, 3D volume data processing, surface extraction, and 2D depth projection.

The shape features of known objects obtained with the sample set may be manually labeled to create two classifiers for "suspicious explosive" and "non-explosive." For a new unknown object, its shape features may be first obtained, and then applied to the classifiers for shape recognition. If the object shape is determined to be a "suspicious explosive," the object will be further determined whether to be explosive in combination with the material features of the object. In this way, the detection is fulfilled.

According to the above embodiments, after acquisition of slice data, a 3D object is generated through thresholding, image segmentation, connection of segmented regions across sections, and inter-slice data interpolation. Then, the 3D object is subjected to surface extraction, depth projection along certain directions, and feature extraction from the depth projections to obtain a feature vector. Next, a shape-based classifier is trained to classify and recognize the shape of an unknown object. Finally, for an object having a suspicious shape, it is determined whether to be explosive in combination with its material property, such as atomic number and/or density.

On the contrary, conventional methods extract material features directly after sections acquisition and segmentation, and no 3D processing is involved. Thus, essential shape information of the object is discarded. This is the reason why the concept of "object" is obscure in the conventional methods. The embodiments of the present disclosure, however, extract a shape feature of the object based on 3D information processing, and perform further recognition only if the object meets a certain shape constraint. In this way, the embodiments bring the advantages of DECT technology into play, and reduce a false alarm rate while providing innovation into the technology.

Various embodiments of the apparatus and method for producing distributed x-rays have been described in detail with reference to block diagrams, flowcharts, and/or examples. In the case that such block diagrams, flowcharts, and/or examples include one or more functions and/or operations, those skilled in the art will appreciate that each function and/or operation in the block diagrams, flowcharts, and/or examples can be implemented, individually and/or collectively, as various hardware, software, firmware or substantially any combination thereof. In an embodiment, several parts of the subject matters illustrated in the embodiments, such as control process, may be implemented with application specific integrated circuit (ASIC), field programmable gate array (FPGA), digital signal processor (DSP) or any other integrated format. Those skilled in the art will appreciate that some aspects of the embodiments disclosed here, in part or as a whole, may be equivalently implemented in an integrated circuit, as one or more computer programs running on one or more computers (e.g., one or more programs running on one or more computer systems), as one or more programs running on one or more processors (e.g., one or more programs running on one or more microprocessors), in firmware, or in substantially any combination thereof. Those skilled in the art are able to design circuits and/or write software and/or firm codes according to the present disclosure. Further, those skilled in the art will appreciate that the control process in the present disclosure can be distributed as various forms of program products. Whatever specific type of signal bearing medium is used to fulfill the distribution, the example embodiments of the subject matters of the present disclosure are applicable. Examples of the signal bearing medium include but not limited to recordable medium, such as floppy disk, hard disk drive, compact disk (CD), digital versatile disk (DVD), digital tape, computer memory, and transmission-type medium, such as digital and/or analog communication medium (e.g., optical fiber cable, waveguide, wired and wireless communication link).

The present disclosure has been described with reference to several exemplary embodiments. It will be appreciated that the terms used here are for illustration, are exemplary other than limiting. The present disclosure can be practiced in various forms within the spirit or subject matter of the present disclosure. It will be appreciated that the foregoing embodiments are not limited to any of the above detailed description, and should be construed in a broad sense within the spirit and scope defined by the appended claims. All changes and variations falling into the scope of the claims or their equivalents should be encompassed by the appended claims.

What is claimed is:

1. A method to extract a shape feature of an object in a computed tomography (CT) system, the method comprising:

acquiring slice data of an article under inspection with the CT system;

generating, from the slice data, 3-dimensional (3D) volume data of an object in the article;

calculating, based on the 3D volume data, a first depth projection image of the object in a direction perpendicular to a horizontal plane, and second, third and fourth depth projection images in three other directions, wherein a projection direction of the fourth depth projection image is orthogonal to the projection directions of the second and third depth projection images;

calculating a metric of probability that the first depth projection image might contain the horizontal plane;

calculating a metric of symmetry for each of the first, second, third, and fourth depth projection images; and generating a shape feature parameter for the object at least based on the metric of probability and the respective metrics of symmetry of the first to fourth depth projection images.

2. The method of claim 1, wherein the calculating the metric of probability that the first depth projection image might contain the horizontal plane comprises calculating an area ratio of a liquid surface portion to the first projection image as the metric of probability.

3. The method of claim 1, wherein the calculating the metric of probability that the first depth projection image might contain the horizontal plane comprises calculating a shape similarity between a liquid surface portion and the first projection image as the metric of probability.

4. The method of claim 1, wherein the calculating the metric of probability that the first depth projection image might contain the horizontal plane comprises calculating an offset that a center of gravity of a liquid surface portion deviates from a center of gravity of the first projection image as the metric of probability.

5. The method of claim 1, wherein the calculating the metric of probability that the first depth projection image might contain the horizontal plane comprises calculating a degree that a metric of symmetry of a liquid surface portion approximates a metric of symmetry of the first projection image as the metric of probability.

6. The method of claim 1, wherein the projection directions of the second and third depth projection images are substantially orthogonal to each other, and approximate directions of maximal and minimal projection areas of the object, respectively.

7. The method of claim 1, further comprising calculating a similarity between each of two of the second, third and fourth depth projection images, wherein the shape feature parameter further includes the calculated similarities.

8. The method of claim 1, further comprising calculating a duty ratio and aspect ratio for each of the second, third and fourth depth projection images, wherein the shape feature parameter further includes the duty ratio and aspect ratio.

9. The method of claim 1, further comprising calculating a number of facets of a 3D model for the object based on the 3D volume data, and determining a complexity of the 3D model based on the number of facets and a predefined average number of facets, wherein the shape feature parameter further includes the complexity.

10. The method of claim 1, wherein the generating, from the slice data, 3D volume data of the object comprises:

performing image segmentation on the slice data to divide them into a plurality of regions;

connecting the regions of different slice data based on relations between binary masks of the respective regions to obtain connected object data; and performing inter-slice interpolation on the binary masks of the object to obtain the 3D volume data of the object.

11. The method of claim 1, further comprising, prior to the calculating the first to fourth depth projection images, performing isosurface extraction and isosurface smoothing on the 3D volume data.

12. An apparatus to extract a shape feature of an object in a computed tomography (CT) system, the apparatus comprising;

a storage device configured to store slice data from inspection with the CT system;

a processing unit configured to:

acquire slice data of an article under inspection with the CT system;

generate, from the slice data, 3-dimensional (3D) volume data of an object in the article;

calculate, based on the 3D volume data, a first depth projection image of the object in a direction perpendicular to a horizontal plane, and second, third and fourth depth projection images in three other directions, wherein a projection direction of the fourth depth projection image is orthogonal to projection directions of the second and third depth projection images;

calculate a metric of probability that the first depth projection image might contain the horizontal plane;

calculate a metric of symmetry for each of the first, second, third, and fourth depth projection images; and generate a shape feature parameter for the object at least based on the metric of probability and the respective metrics of symmetry of the first to fourth depth projection images.

13. The apparatus of claim 12, wherein, to calculate the metric of probability that the first depth projection image might contain the horizontal plane, the processing unit is further configured to calculate an area ratio of a liquid surface portion to the first projection image as the metric of probability.

14. The apparatus of claim 12, wherein, to calculate the metric of probability that the first depth projection image might contain the horizontal plane, the processing unit is further configured to calculate a shape similarity between a liquid surface portion and the first projection image as the metric of probability.

15. The apparatus of claim 12, wherein, to calculate the metric of probability that the first depth projection image might contain the horizontal plane, the processing unit is further configured to calculate an offset that a center of gravity of a liquid surface portion deviates from a center of gravity of the first projection image as the metric of probability.

16. The apparatus of claim 12, wherein, to calculate the metric of probability that the first depth projection image might contain the horizontal plane, the processing unit is further configured to calculate a degree that a metric of symmetry of a liquid surface portion approximates a metric of symmetry of the first projection image as the metric of probability.

17. The apparatus of claim 12, wherein the projection directions of the second and third depth projection images are substantially orthogonal to each other, and approximate directions of maximal and minimal projection areas of the object, respectively.

18. The apparatus of claim 12, wherein the processing unit is further configured to calculate a similarity between each of two of the second, third and fourth depth projection images, wherein the shape feature parameter further includes the calculated similarities.

19. The apparatus of claim 12, wherein the processing unit is further configured to calculate a duty ratio and aspect ratio for each of the second, third and fourth depth projection images, wherein the shape feature parameter further includes the duty ratio and aspect ratio.

20. The apparatus of claim 12, wherein the processing unit is further configured to calculate a number of facets of a 3D model for the object based on the 3D volume data, and determine a complexity of the 3D model based on the number of facets and a predefined average number of facets, wherein the shape feature parameter further includes the complexity.

21. The apparatus of claim 12, wherein, to generate, from the slice data, 3D volume data of the object, the processing unit is further configured to:

perform image segmentation on the slice data to divide them into a plurality of regions;

connect the regions of different slice data based on relations between binary masks of the respective regions to obtain connected object data; and perform inter-slice interpolation on the binary masks of the object to obtain the 3D volume data of the object.

22. The apparatus of claim 12, wherein the processing unit is further configured to, prior to calculation of the first to fourth depth projection images, perform isosurface extraction and isosurface smoothing on the 3D volume data.

23. A method of security inspection of an article in a computed tomography (CT) system, the method comprising:

acquiring slice data of an article under inspection with the CT system;

generating, from the slice data, 3-dimensional (3D) volume data of an object in the article;

calculating, based on the 3D volume data, a first depth projection image of the object in a direction perpendicular to a horizontal plane, and second, third and fourth depth projection images in three other directions, wherein a projection direction of the fourth depth projection image is orthogonal to projection directions of the second and third depth projection images;

calculating a metric of probability that the first depth projection image might contain the horizontal plane;

calculating a metric of symmetry for each of the first, second, third, and fourth depth projection images;

generating a shape feature parameter for the object at least based on the metric of probability and the respective metrics of symmetry of the first to fourth depth projection images; and determining whether the object is suspicious based on the shape feature parameter and a physical property of material contained in the object.

24. The method of claim 23, further comprising calculating a similarity between each two of the second, third and fourth depth projection images, wherein the shape feature parameter further includes the calculated similarities.

25. The method of claim 23, further comprising calculating a duty ratio and aspect ratio for each of the second, third and fourth depth projection images, wherein the shape feature parameter further includes the duty ratio and aspect ratio.

26. The method of claim 23, further comprising calculating a number of facets of a 3D model for the object based on the 3D volume data, and determining a complexity of the 3D model based on the number of facets and a predefined average number of facets, wherein the shape feature parameter further includes the complexity.

27. The method of claim 23, wherein the determining whether the object is suspicious based on the shape feature parameter and the physical property of material contained in the object comprises:

classifying the object using a classifier based on the shape feature parameter; and classifying the object using a classifier based on the physical property if the object meets a requirement of the shape feature parameter.

28. The method of claim 23, wherein the CT system is a dual-energy CT system, the physical property comprises equivalent atomic number and/or equivalent electron density, and the determining whether the object is suspicious based on the shape feature parameter and the physical property of material contained in the object comprises:

classifying the object using a classifier based on the shape feature parameter; and classifying the object using a classifier based on the equivalent atomic number and/or equivalent electron density if the object meets a requirement of the shape feature parameter.

29. The method of claim 23, wherein the CT system is a mono-energy CT system, the physical property comprises a linear attenuation coefficient, and the determining whether the object is suspicious based on the shape feature parameter and the physical property of material contained in the object comprises:

classifying the object using a classifier based on the shape feature parameter; and classifying the object using a classifier based on the linear attenuation coefficient if the object meets a requirement of the shape feature parameter.

30. The method of claim 23, wherein the projection directions of the second and third depth projection images are substantially orthogonal to each other, and approximate directions of maximal and minimal projection areas of the object, respectively.

31. An apparatus for security inspection of an article in a computed tomography (CT) system, the apparatus comprising:

a storage device configured to store slice data from inspection with the CT system;

a processing unit configured to:

acquire slice data of an article under inspection with the CT system;

generate, from the slice data, 3-dimensional (3D) volume data of an object in the article;

calculate, based on the 3D volume data, a first depth projection image of the object in a direction perpendicular to a horizontal plane, and second, third and fourth depth projection images in three other directions, wherein a projection direction of the fourth depth projection image is orthogonal to projection directions of the second and third depth projection images;

calculate a metric of probability that the first depth projection image might contain the horizontal plane;

calculate a metric of symmetry for each of the first, second, third, and fourth depth projection images;

generate a shape feature parameter for the object at least based on the metric of probability and the respective metrics of symmetry of the first to fourth depth projection images; and determine whether the object is suspicious based on the shape feature parameter and a physical property of material contained in the object.

32. The apparatus of claim 31, wherein, to determine whether the object is suspicious based on the shape feature parameter and the physical property of material contained in the object, the processing unit is further configured to:

classify the object using a classifier based on the shape feature parameter; and classify the object using a classifier based on the physical property if the object meets a requirement of the shape feature parameter.

33. The apparatus of claim 31, wherein the CT system is a dual-energy CT system, wherein the physical property comprises equivalent atomic number and/or equivalent electron density, and wherein, to determine whether the object is suspicious based on the shape feature parameter and the physical property of material contained in the object, the processing unit is further configured to:

classify the object using a classifier based on the shape feature parameter; and classify the object using a classifier based on the equivalent atomic number and/or equivalent electron density if the object meets a requirement of the shape feature parameter.

34. The apparatus of claim 31, wherein the CT system is a mono-energy CT system, wherein the physical property comprises a linear attenuation coefficient, and wherein, to determine whether the object is suspicious based on the shape feature parameter and the physical property of material contained in the object, the processing unit is further configured to:

classify the object using a classifier based on the shape feature parameter; and classify the object using a classifier based on the linear attenuation coefficient if the object meets a requirement of the shape feature parameter.

35. A non-transitory computer readable medium, the medium comprising instructions configured to cause performance, by a computer system, of a method comprising:

acquiring slice data of an article under inspection with a computed tomography (CT) system;

generating, from the slice data, 3-dimensional (3D) volume data of an object in the article;

calculating, based on the 3D volume data, a first depth projection image of the object in a direction perpendicular to a horizontal plane, and second, third and fourth depth projection images in three other directions, wherein a projection direction of the fourth depth projection image is orthogonal to the projection directions of the second and third depth projection images;

calculating a metric of probability that the first depth projection image might contain the horizontal plane;

calculating a metric of symmetry for each of the first, second, third, and fourth depth projection images; and generating a shape feature parameter for the object at least based on the metric of probability and the respective metrics of symmetry of the first to fourth depth projection images.

36. A non-transitory computer readable medium, the medium comprising instructions configured to cause performance, by a computer system, of a method comprising:

acquiring slice data of an article under inspection with a computed tomography (CT) system;

generating, from the slice data, 3-dimensional (3D) volume data of an object in the article;

calculating, based on the 3D volume data, a first depth projection image of the object in a direction perpendicular to a horizontal plane, and second, third and fourth depth projection images in three other directions, wherein a projection direction of the fourth depth projection image is orthogonal to projection directions of the second and third depth projection images;

calculating a metric of probability that the first depth projection image might contain the horizontal plane;

calculating a metric of symmetry for each of the first, second, third, and fourth depth projection images;

generating a shape feature parameter for the object at least based on the metric of probability and the respective metrics of symmetry of the first to fourth depth projection images; and determining whether the object is suspicious based on the shape feature parameter and a physical property of material contained in the object.

* * * * *